(12) United States Patent
Embrechts (10) Patent No.: US 12,197,622 B2
(45) Date of Patent: Jan. 14, 2025

(54) PRIVACY PRESERVING DATA STORING METHOD AND A PRIVACY PRESERVING DATA STORING SYSTEM FOR ANALYZING A TRAVEL BEHAVIOR OF ONE OR MORE USERS OF MOBILITY-AS-A-SERVICE (MAAS) TRANSPORTATION SERVICES

(71) Applicant: Sony Group Corporation, Tokyo (JP)

(72) Inventor: Hugo Embrechts, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 246 days.

(21) Appl. No.: 17/797,447

(22) PCT Filed: Mar. 9, 2021

(86) PCT No.: PCT/EP2021/055941
§ 371 (c)(1),
(2) Date: Aug. 4, 2022

(87) PCT Pub. No.: WO2021/197775
PCT Pub. Date: Oct. 7, 2021

(65) Prior Publication Data
US 2023/0091700 A1    Mar. 23, 2023

(30) Foreign Application Priority Data
Mar. 31, 2020   (EP) .................................... 20166950

(51) Int. Cl.
G06F 21/00       (2013.01)
G06F 21/60       (2013.01)
G06F 21/62       (2013.01)

(52) U.S. Cl.
CPC ........ *G06F 21/6254* (2013.01); *G06F 21/602* (2013.01)

(58) Field of Classification Search
None
See application file for complete search history.

(56) References Cited

U.S. PATENT DOCUMENTS

2010/0199089 A1*  8/2010  Vysogorets ............. G06F 21/34
                                                      713/168
2018/0137487 A1*  5/2018  Wang ..................... G06Q 30/06
(Continued)

FOREIGN PATENT DOCUMENTS

WO     2019/121271 A1    6/2019

OTHER PUBLICATIONS

Al-Hussaeni, Khalil et al., SafePath: Differentially-private publishing of passenger trajectories in transportation systems:, Computer Networks, Elsevier, Amsterdam, NL, vol. 143, Jul. 7, 2018, pp. 126-139 Second reference: Vysogorets et al., (Year: 2018).*

(Continued)

*Primary Examiner* — Andrew J Steinle
(74) *Attorney, Agent, or Firm* — XSENSUS LLP (57) ABSTRACT

The present disclosure relates to a privacy preserving data storing method, in particular for analyzing a travel behavior of one or more users of mobility-as-a-service (MaaS) transportation services. The method comprises storing at least one user identification, user ID, identifying the one or more users on a trip together with a trip identification, trip ID, identifying the trip in a database entry of a first database and storing trip information on the trip with the trip ID in a database entry of a separate second database. The method further provides for associating the database entries of the first and second databases associated with the same trip ID for an analysis of the travel behavior of the users based on the associated database entries of the first and the second database.

19 Claims, 5 Drawing Sheets

(56) References Cited

U.S. PATENT DOCUMENTS

| | | | |
|---|---|---|---|
| 2018/0350024 A1 | 12/2018 | Kaufman | |
| 2019/0279750 A1 | 9/2019 | Wang | |
| 2020/0285720 A1* | 9/2020 | Alsolami | ........... G06V 40/1353 |

OTHER PUBLICATIONS

International Search Report and Written Opinion mailed on Jun. 1, 2021, received for PCT Application PCT/EP2021/055941, filed on Mar. 9, 2021, 8 pages.

Al-Hussaeni et al., "SafePath: Differentially-private publishing of passenger trajectories in transportation systems", Computer Networks, vol. 143, No. 7, Jul. 2018, pp. 126-139.

Lopez et al., "A blockchain framework for smart mobility", arXiv:1809.05785v1, Sep. 18, 2018, pp. 1-10.

Kang et al., "A Privacy-Preserving Mobile Payment System for Mass Transit", IEEE Transactions on Intelligent Transportation Systems, vol. 18, No. 8, Aug. 2017, pp. 2192-2205.

Karinsalo et al., "Smart Contracts for a Mobility-as-a-service Ecosystem", Available Online At: https://www.researchgate.net/publication/325966533_Smart_Contracts_for_a_Mobility-as-a-Service_Ecosystem, Jun. 25, 2018, 5 pages.

Pinkas et al., "Phasing: Private Set Intersection using Permutation-based Hashing", USENIX, 2015, pp. 1-21.

Sümmermann et al., "The joint journey towards seamless mobility", Concept Paper, Open Mobility System OMOS, Available Online At: https://www.omos.io/wp-content/uploads/whitepaper/OMOS_concept_paper.pdf, Retrieved from Net on: Sep. 6, 2017, pp. 1-34.

"Shamir's Secret Sharing", Wikipedia, Available Online At: https://en.wikipedia.org/w/index.php?title=Shamir%27s_Secret_Sharing&oldid=940282092, Retrieved from Net on: Jul. 5, 2022, pp. 1-7.

"Could mobility as a service solve our transport problems?", Institution of Engineering and Technology, Available Online At: https://www.theiet.org/media/3666/mobility-as-a-service-report.pdf, Retrieved from Net on: Mar. 21, 2019, pp. 1-40.

Lindell et al., "Secure Multiparty Computation for Privacy-Preserving Data Mining", Journal of Privacy and Confidentiality, vol. 1, No. 1, 2009, pp. 59-98.

* cited by examiner

PRIVACY PRESERVING DATA STORING METHOD AND A PRIVACY PRESERVING DATA STORING SYSTEM FOR ANALYZING A TRAVEL BEHAVIOR OF ONE OR MORE USERS OF MOBILITY-AS-A-SERVICE (MAAS) TRANSPORTATION SERVICES

CROSS-REFERENCE TO RELATED APPLICATIONS

The present application is based on PCT filing PCT/EP2021/055941, filed Mar. 9, 2021, which claims priority to EP 20166950.4, filed Mar. 31, 2020, the entire contents of each are incorporated herein by reference.

FIELD

The present disclosure relates to a privacy preserving data storing method and a privacy preserving data storing system, in particular for analyzing a travel behavior of one or more users of mobility-as-a-service (MaaS) transportation services.

BACKGROUND

General Data Protection Regulations (GDPR) govern a manner in which personal information may be stored. For example, in accordance with the so-called "right to be forgotten" personal information may not be stored on blockchain since by definition the blockchain or its content cannot be deleted. Hence, data analytics on the blockchain's content may be limited as the content cannot be personalized and therefore not interrelated through personal information.

To be specific, assume that multiple sets of information on subsequent trips of a user of MaaS transportation services may not be personalized with a name of the user. Consequently, it may not be possible to analyze a travelling behavior of the user since it is not possible to put the multiple sets of information into context based on the name of the user.

Hence, there may be a demand for an improved data storing method and an improved privacy preserving data storing system, in particular for analyzing a travel behavior of one or more users of mobility-as-a-service (MaaS) transportation services.

SUMMARY

This demand can be satisfied by the subject-matter of the appended independent and dependent claims of the present disclosure.

According to a first aspect, the present disclosure relates to a privacy preserving data storing method, in particular for analyzing a travel behavior of one or more users of mobility-as-a-service (MaaS) transportation services. The method comprises storing at least one user identification, user ID, identifying the one or more users on a trip together with a trip identification, trip ID, identifying the trip in a database entry of a first database and storing trip information on the trip with the trip ID in a database entry of a separate second database. The method further provides for associating the database entries of the first and second databases associated with the same trip ID for an analysis of the travel behavior of the users based on the associated database entries of the first and the second database.

An analysis of the travel behavior, for example, aims at determining an overall duration or distance of a travel including multiple subsequent trips of a particular user. In other possible applications, the analysis can intend to determine destinations where the user changed a transportation vehicle.

The trip can be understood as a ride with a transportation vehicle or multiple transportation vehicles of a same or different mobility service providers of the MaaS transportation services. The mobility service providers, for example, are public or private transportation companies.

The trip information, for example, includes a start location, a destination, a start time and/or an end time of the trip, which may be recorded in the course of a check-in, a check-out and/or a booking of the user.

The user ID, for example, comprises names or bank data of the users, which have been provided by the users for paying purposes via an interface to the MaaS transportation services. The interface can be understood as an electronic communication interface which, for example, is an application executable on a mobile device or on a computer.

The trip ID can be a unique identifier which has been defined by the mobility service providers. For example, the trip ID is a hash value or a (prime) number.

The second database can be a "public" database to which several of the mobility service providers have access for sharing further information on other trips of the user. For example, the second database can be stored on a cloud storage or on a distributed ledger.

In order to keep the user ID private, the first database can be a local data storage (e.g. a hard disc drive, a compact disc or any other electronic data storage) which is controlled by one of the mobility service providers such that no external entity has access to the user ID.

The first and the second database each can be stored on separate electronic data storages.

For the analysis, a data processing circuitry which is coupled to both the first and the second database can retrieve the database entries and identify the database entries associated with the same trip ID.

On the one hand, the aforementioned method allows to combine multiple sets of trip information of same users, for example, to derive destinations where the user changed transportation vehicles.

On the other hand, the aforementioned concept allows to store the second database on a blockchain in accordance with the "right to be forgotten", as the user ID is stored separately from the blockchain such that it can be deleted.

According to a second aspect, the present disclosure relates to a computer program comprising instructions which, when being executed by at least one processor, causes the processor to perform the method of any one of the preceding claims.

In some embodiments, the computer program may at least partly execute a multi-party computation protocol for the analysis of the travel behavior, as stated in more detail below.

According to a third aspect, the present disclosure relates to a privacy preserving data storing system, in particular for analyzing a travel behavior of one or more users of mobility-as-a-service (MaaS) transportation services. The system comprises a first database for storing at least one user identification, user ID, identifying the one or more users on a trip together with a trip identification, trip ID, identifying the trip in a database entry of the first database.

Further, the system comprises a separate second database for storing trip information on the trip with the trip ID in a database entry of the second database. The system further comprises a data processing circuitry for associating the one or more users with the trip based on a combination of the database entries of the first and second databases associated with the same trip ID for an analysis of the travel behavior of the users based on the associated database entries of the first and the second database.

The data storing system can be used to carry out the aforementioned method and/or the computer program. In this regard, it is noted that features specified in connection with the first or the second aspect of the present disclosure may be applied analogously to the data storing system and vice versa.

According to a fourth aspect, the present disclosure relates to a data processing circuitry for receiving at least one user identification, user ID, identifying one or more users on a trip together with a trip identification, trip ID, identifying the trip stored in a database entry of a first database. Further, the data processing circuitry can be used for receiving trip information on the trip together with the trip ID stored in a database entry of a separate second database. The data processing circuitry can further be used for associating the database entries of the first and second databases associated with the same trip ID for an analysis of the travel behavior of the users based on the associated database entries of the first and the second database.

The data processing circuitry can be coupled to the first and the second database in a wired or wireless fashion to receive the database entries.

In some embodiments, the data processing circuitry at least comprises, or corresponds to, a processor, a microcontroller, a field-programmable array and/or another programmable hardware. Further, the aforementioned computer program can at least party by executed by the data processing circuitry to cause the data processing circuitry to carry out the aforementioned method at least partly.

It should be noted that the data processing circuitry described in context of the fourth aspect may correspond to the one described in context with the third context. In this regard it should be noted that features mentioned in connection with the third aspect may be applied to the data processing circuitry described in connection with the fourth aspect and vice versa.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Mobility-as-a-Service (MaaS) describes a shift away from personally-owned modes of transportation and towards mobility provided as a service. This can be enabled by combining transportation services from public and private mobility service providers through a unified gateway that creates and manages the trip, which users can pay for with a single account. A key concept behind MaaS is to offer travelers mobility solutions based on their travel needs.

In order, for example, to adapt a transportation schedule of different providers to each other, the different providers may gather information on trips of their users and determine, for example, where and/or when most of the users change between transportation vehicles of the different providers.

According to data protection regulations or due to concerns about a security of personal information it may be undesired and/or illegal to share personalized information on the trip of the users. This can limit an analysis of a travel behavior of the users since sets of information of a same users gathered by each of the providers cannot be associated with each other. Thus, for example, it is not be possible to determine where and/or when a particular user has changed between transportation vehicles.

Hence, there may be a demand for an improved data storing method and an improved privacy preserving data storing system, in particular for analyzing a travel behavior of one or more users of mobility-as-a-service (MaaS) transportation services.

Figure 1:
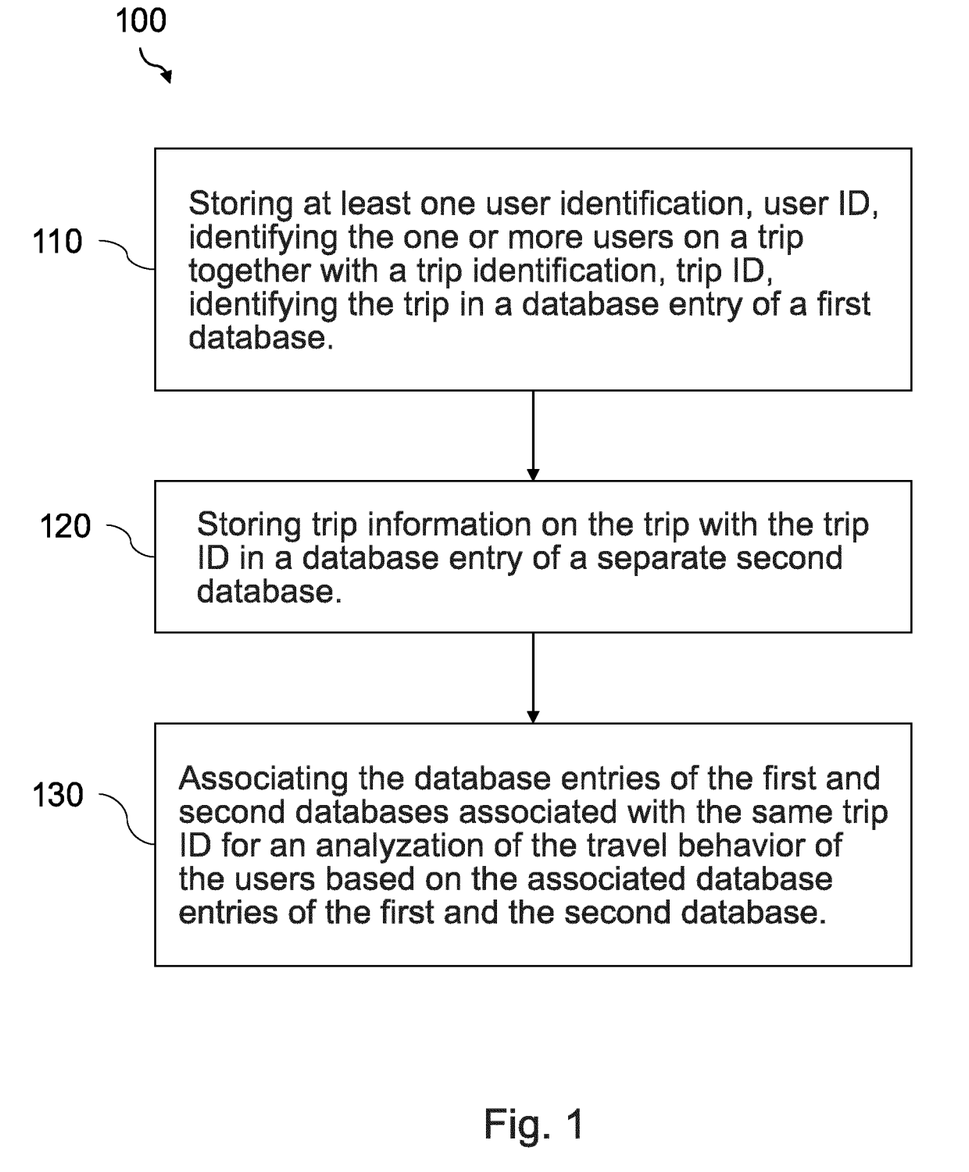
FIG. 1 shows a flowchart schematically illustrating a privacy preserving data storing method, in particular for analyzing a travel behavior of one or more users of mobility-as-a-service transportation services.

FIG. 1 shows a flowchart schematically illustrating a privacy preserving data storing method 100 for analyzing a travel behavior of one or more users of mobility-as-a-service transportation services.

Figure 2:
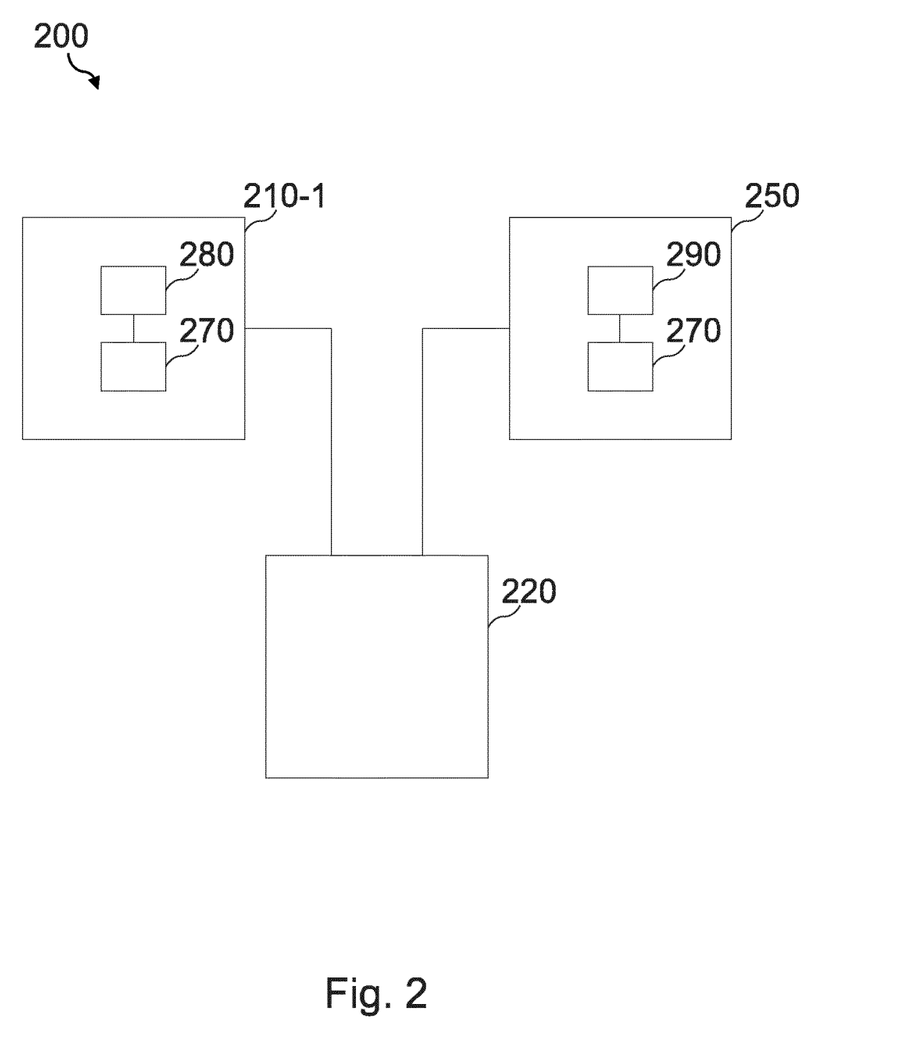
FIG. 2 illustrates a privacy preserving data storing system, in particular for analyzing a travel behavior of one or more users of mobility-as-a-service transportation services.

To put the method 100 in context of a technical implementation, the method 100 should be described in the following by reference to FIG. 2, which illustrates an embodiment of a privacy preserving data storing system 200.

According to a basic idea, the method 100 provides for storing 110 and 120 the personal information, namely a user identification 280 (user ID), and non-personal information, namely a trip information 290, on a trip of one or more users, each together with a (predefined) trip identification 270 (trip ID) as a database entry in separate databases 210-1 and 250 of the system 200.

For example, each of multiple mobility service providers of a "MaaS consortium/ecosystem" may run such a data storing system 200. The users can provide the mobility service providers with their user ID 280, e.g., via an interface to the mobility service providers. Such interfaces can be certain MaaS applications running on a smartphone or a computer of the users. In some cases such applications can also be used by the users for booking a travel or a trip which may involve travels with multiple of the mobility service providers.

In the course of booking or afterwards, the application may further predefine the trip ID 270 and the trip information 290 depending on a travelling plan requested by the users.

The user ID 280 (e.g. name, bank data, date of birth, address, nationality), for example, is stored on the first database 210-1 and the trip information 290 is stored on the second database 250.

The first and the second database 210-1 and 250 may further be implemented on separate electronic data storages.

The trip information 290, for example, includes a start location, a destination, a start time and/or an end time of the trip, which may be recorded in the course of a check-in, a check-out and/or a booking of the user.

In general, the said users can be passengers of a same transportation vehicle or separate transportation vehicles. Consequently, the trip information 290 can include a set of multiple start locations and destinations which, for example, are listed in one or more vectors or matrices.

The trip ID 270 can be understood as a unique identifier of the trip. For example, the trip ID 270 is a hash value.

The method 100 further proposes associating the database entries of the first and second database 210-1 and 250 associated with the same trip ID 270 for an analysis of the travel behavior of the users based on the associated database entries of the first and the second database 210-1 and 250.

This, for example, allows to link respective trip information 290 to each of the users, which consequently enables associating trip information 290 of same users, as stated in more detail below.

An association of the database entries can be carried out by a (intermediate) data processing circuitry 220 of the system 200, such as a processor or a similar programmable hardware device, which is coupled to the first and the second database 210-1 and 250.

In "MaaS applications", the second database 250 can be shared between multiple mobility service providers e.g. using a blockchain, wherein the user IDs gathered by the mobility service providers can be stored on multiple separated databases each controlled by one of the mobility service providers in order to keep the user IDs private.

Figure 3:
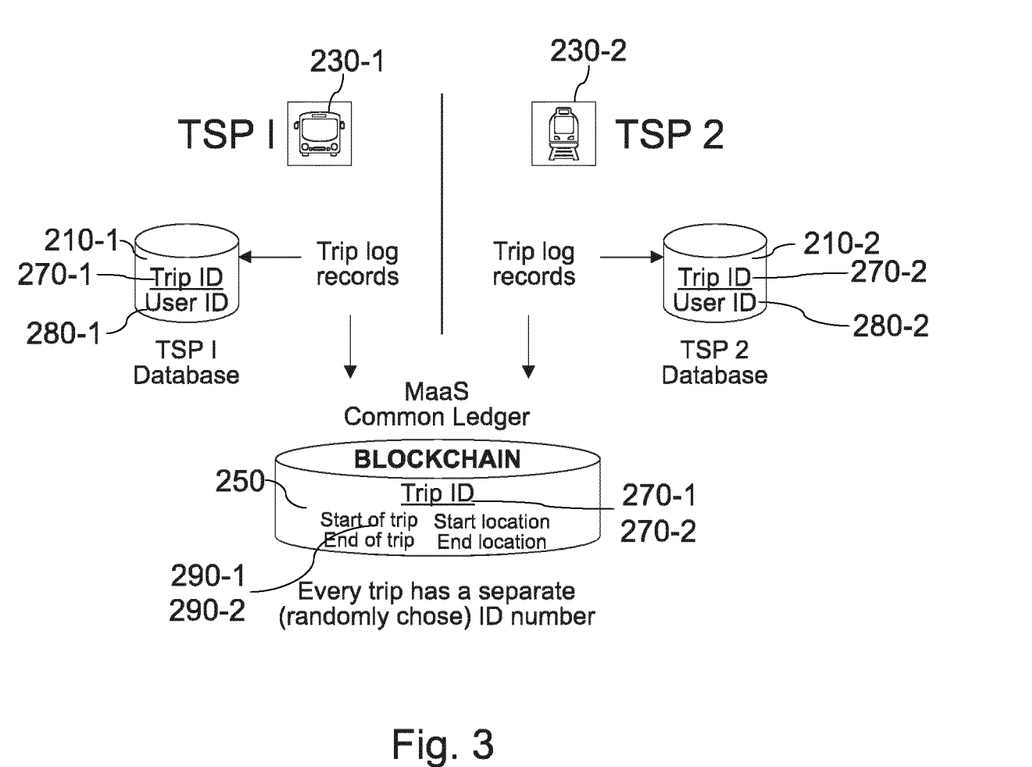
FIG. 3 schematically illustrates an implementation of the method for analyzing the travel behavior of users travelling with multiple mobility service providers/vehicles.

FIG. 3 illustrates a scenario in which one or more users of MaaS transportation services travel by bus of a first mobility service provider 230-1 and by train of another second mobility service provider 230-2.

In this scenario, the analysis can aim to determine a time, a station (e.g. a bus stop or a train station) where and/or how many of the users changed from the bus to the train, for example, to adapt schedules of the mobility service providers 230-1 230-2 to each other.

For this, each of the mobility service providers 230-1 and 230-2 can gather data/information on the trip of the users with the respective mobility service providers 230-1 and 230-2, respectively and share the gathered data via the second database 250. Since the mobility service providers 230-1 and 230-2 can share the second database 250, it is also called a common "travel record ledger (TRL)". As can be seen in FIG. 3, a common choice for such a TRL is a blockchain, because of its immutability properties.

Thus, regarding the concerns about data protection security, it may be undesired and/or illegal to store and share the user ID 280 via the blockchain 250. Rather, the user ID 280 needs to be stored separate from the trip information 290 shared between the mobility service providers 230-1 and 230-2.

For example, the first mobility service provider 230-1 stores, for each of a plurality of first users travelling by bus, a first user ID 280-1 together with a first trip ID 270-1 in a database entry of the first database 210-1 controlled (only) by the first mobility service provider 230-1. Further, respective first trip information 290-1 can be stored together with the first trip ID 270-1 in another database entry on the blockchain 250.

Analogously, the second mobility service provider 230-2 stores, for each of a plurality of second users travelling by train, a second user ID 280-2 together with a second trip ID 270-2 in a database entry of a third database 210-2 controlled (only) by the second mobility service provider 230-2 and respective second trip information 290-2 together with the second trip ID 270-2 in another database entry on the blockchain 250.

In this way, the mobility service providers 230-1 and 230-2 on the one hand can share the trip information 290-1 and 290-2 while keeping the user IDs 280-1 and 280-2 private in compliance with data protection regulations. On the other hand, using the trip IDs 270-1 and 270-2, the user IDs 280-1 and 280-2 can be mapped onto the respective trip information 290-1 and 290-2, for example, in order to determine whether, where, when and/or who of the second users changed from the bus to the train.

This can be described in more detail by reference to FIG. 4.

Figure 4:
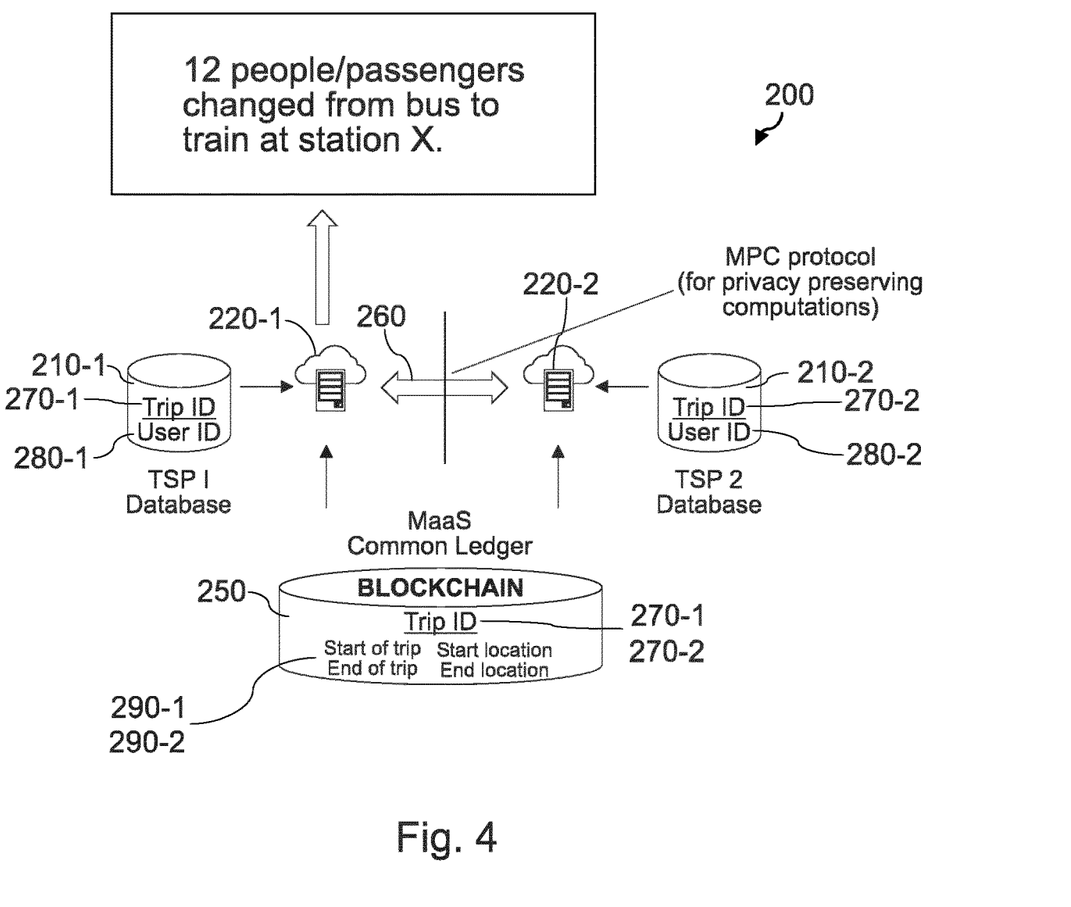
FIG. 4 schematically illustrates privacy preserving computation for analyzing the travel behavior.

FIG. 4 shows another embodiment of the system 200 comprising a first data processing circuitry 220-1 and a second data processing circuitry 220-2 which are configured to handle, edit and/or retrieve data from the blockchain 250 as well as the first and the second database 210-1 and 210-2, respectively.

The first data processing circuitry 220-1 can be under control of the first mobility service provider 230-1 and the second data processing circuitry 220-2 can be under control of the second mobility service provider 230-2.

For the analysis of the travel behavior, the first and the second data processing circuitry 220-1 and 220-2 can combine the database entries associated with the same trip ID 270-1 and 270-2, respectively. The first and the second data processing circuitry 220-1 and 220-2 can execute a (secure) multi-party computation protocol for the analysis of the travel behavior of the users by taking the database entries associated with the same trip ID as input.

(Secure) multi-party computation (also known as privacy-preserving computation) is a sub-field of cryptography with the goal of creating methods for parties to jointly compute a function over their inputs while keeping those inputs private.

According to this definition, the MPC protocol provides a data protection-compliant option of an analysis of the database entries. In particular, he MPC protocol can enable an analysis of database entries with matching user IDs 280-1 and 280-2 without the first and the second user ID 280-1 and 280-2 being exchanged between the databases 210-1, 210-2, 250 and between the first and the second data processing circuitry 220-1 and 220-2, respectively, e.g. to comply with data protection regulations. This, for example, allows an analysis of the trip information 270-1 and 270-2 related to same/identical user/s.

In order to prevent unauthorized entities from accessing the first and the second user ID 280-1 and 280-2, as well as the first and the second trip information 290-1 and 290-2, those can be encrypted, for example, in the course of storing the first user ID 280-1, the second user ID 280-1, the first trip information 290-1 and the second trip information. Consequently, the first and the second data processing circuitry 220-1 and 220-2 may be configured to decrypt the user IDs 280-1 and 280-2, as well as the trip information 290-1 and 290-2 in connection with the analysis.

The above described concept, for example, can be used by a plurality of mobility service providers collaborating in terms of MaaS transportation services, in particular, if the mobility service providers want to share the blockchain 250 for the analysis of the trip information.

To be more specific, the (privacy preserving) association of the aforementioned database entries for purposes of the analysis is described by reference to a specific example as follows:

The first users include 156 people who left the bus of the first mobility service provider 230-1 at 3:45 pm at station X, and 12 of the 156 people continue their journey from station X by a train with destination Y of the second mobility service provider 230-2 at 3:53 pm. Thus, the 12 people can be referred to as a portion of the second users who get on the train.

The first and the second user IDs 280-1 and 280-2 thus may include names and bank account numbers of the 156 people travelling by bus and of the 12 people travelling by train.

In this example, the first trip information 290-1, for example, includes an end time at which the 156 people left the bus and the second trip information 290-2 may include a start time at which the 12 people entered the train.

As mentioned above, each entry of the user IDs 280-1 and 280-2, for example each of the names and bank account numbers, shares a respective trip ID 270-1 and 270-2 with one of multiple entries of the trip information 290-1 or 290-2.

As a result, the first and the second data processing circuitry 220-1 and 220-2 can associate the user IDs 280-1 and 280-2 with respective trip information 290-1 and 290-2 having the same trip ID 270-1 or 270-2. For example, user A of the 156 people is associated with the trip information that user A left the bus at 3:45 pm at station X.

In this way, the first and the second data processing circuitry 220-1 and 220-2 can generate a vector $d_1$ including the associated first user IDs 280-1 and first trip information 290-1 and a vector $d_2$ including the associated second user IDs 280-2 and second trip information 290-2.

Both the first and the second vector $d_1$ and $d_2$ can be used as input of a multi-party-computation (MPC) protocol 260 executed partly by each of the first and the second data processing circuitry 220-1 and 220-2. The MPC protocol 260 can be configured to calculate a function $F(d_1, d_2)$ without revealing $d_1$ to the second data processing 220-2 and $d_2$ to the first data processing circuitry 220-1.

The function $F(d_1, d_2)$ can be adapted to a desired objective of the analysis. For example, the function $F(d_1, d_2)$ identifies people who are included in both $d_1$ and $d_2$ to determine a number of the people who changed from the bus to the train at station X between 3:45 pm and 3:53 pm. To this end, the MPC protocol can apply private set intersection to $d_1$ and $d_2$.

Private set intersection is a cryptographic technique which allows two parties holding sets to compare encrypted versions of these sets in order to compute the intersection.

In this scenario, neither the first 230-1 nor the second mobility service provider 230-2 reveals anything to the counterparty except for the trip information 290-1 and 290-2, and the number of people who changed between the bus and the train. Thus, both of the mobility service providers 230-1 and 230-2 can analyze the travel behavior of the users without violating data protection regulations.

Figure 5:
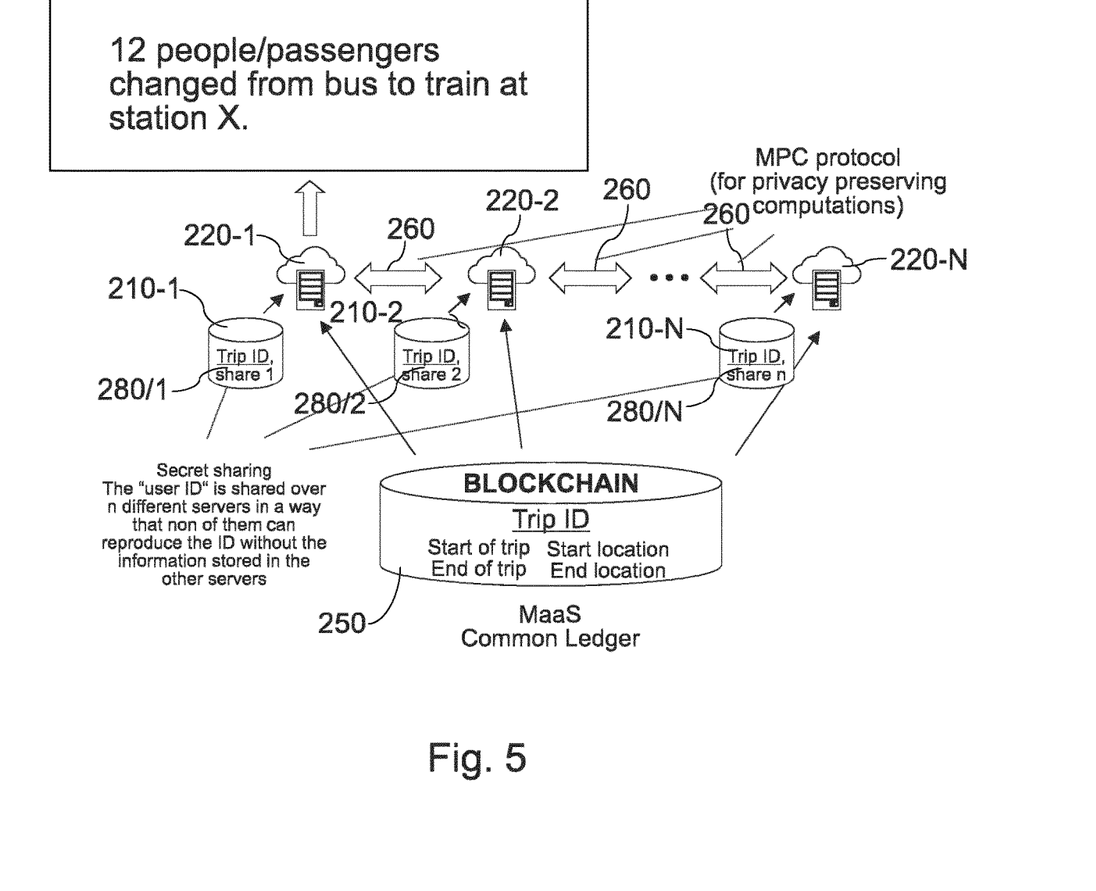
FIG. 5 schematically illustrates storing the user identification using Shamir's secret sharing.

FIG. 5 schematically illustrates a way of storing the user identification using Shamir's secret sharing.

As shown in FIG. 5, a consortium of N mobility service providers may collaborate in the sense of the above described concept of MaaS.

For this, each of N mobility service providers, runs one of N data processing circuitries 220-1, 220-2, . . . , 220-N connected to one of N databases 210-1, 210-2, . . . , 210-N and the blockchain 250, wherein in this scenario, the N databases may be separately stored on N separate data storages.

In the course of booking a travel, the user ID 280 of one or more users can be divided into N shares 280/1, 280/2, . . . , 280/N according to Shamir's secret sharing such that only a combination of a predefined number of the shares 280/1, 280/2, . . . , 280/N enable a conclusion on the user ID 280.

Each of those shares 280/1, 280/2, . . . , 280/N can be distributed to one of the N databases 210-1, 210-2, . . . , 210-N of the N mobility service providers.

Hereby, none of the mobility service providers but only the MPC protocol 260 can retrieve a required number of the shares 280/1, 280/2, . . . , 280/N in order to recover the user ID 280 for the analysis of the travel behavior as described in connection with the above examples.

The following examples pertain to further embodiments:
(1) A privacy preserving data storing method, in particular for analyzing a travel behavior of one or more users of mobility-as-a-service, MaaS, transportation services, the method comprising:

storing at least one user identification, user ID, identifying the one or more users on a trip together with a trip identification, trip ID, identifying the trip in a database entry of a first database;

storing trip information on the trip with the trip ID in a database entry of a separate second database;

associating the database entries of the first and second databases associated with the same trip ID for an analysis of the travel behavior of the users based on the associated database entries of the first and the second database.

(2) Privacy preserving data storing method of any of (1), wherein the method further comprises:

storing the user ID together with the trip ID in a database entry of a third database; and associating the database entries of the first, the second and the third databases associated with the same trip ID for an analysis of the travel behavior of the users based on the associated database entries of the first, the second and the third database.

(3) Privacy preserving data storing method of any one of (1) or (2), wherein the trip information comprises at least one of a start location, a destination, a start time and an end time of the trip.

(4) Privacy preserving data storing method of any one of (1) to (3), wherein the user ID comprises at least one of a name and bank data of at least one of the users.

(5) Privacy preserving data storing method of any one of (1) to (4), wherein the user ID and the trip information are encrypted.

(6) Privacy preserving data storing method of any one of (1) to (5), wherein storing the user ID comprises physically storing a first share of the user ID on a first data storage and physically storing and one or more further shares of the user ID on one or more further data storages; and wherein the method further comprises recovering the user ID based on the first and the one or more further shares in accordance with Shamir's secret sharing scheme for associating the database entries of the first and second databases associated with the same trip ID.

(7) Privacy preserving data storing method of (2), further comprising:

storing at least one first user identification, first user ID, identifying one or more first users on a first trip in a database entry of the first database, the first user ID being associated with a first trip identification, first trip ID, identifying the first trip;

storing at least one second user identification, second user ID, identifying one or more second users on a second trip in a database entry of the third database, the second user ID being associated with a second trip identification, second trip ID, identifying the second trip;

storing first trip information on the first trip in a database entry of the second database, the first trip information being associated with the first trip ID;

storing second trip information on the second trip in a database entry of the second database, the second trip information being associated with the second trip ID; and associating the first and the second users with the respective first and second trip based on a comparison of the data base entries of the first, second, and third databases associated with the same trip ID for the analysis of the travel behavior of the users based on the associated database entries of the first, the second and the third database.

(8) Privacy preserving data storing method of (7), the method comprising executing a secure multi-party computation protocol for the analysis of the travel behavior based on the associated database entries of the first, the second and the third database without exchanging the first and/or the second user ID between any of the databases.

(9) Privacy preserving data storing method of (7), wherein the analysis of the travel behavior comprises identifying identical users among the first and second users by comparing the first and the second user ID.

(10) Privacy preserving data storing method of (8) and (9), wherein executing the secure multi-party computation protocol comprises applying private set intersection to the first user ID associated with the first trip information and the second user ID associated with the second trip information for identifying identical users among the first and second users.

(11) Privacy preserving data storing method of any one of (1) to (10), wherein the second database is stored on a blockchain.

(12) A computer program comprising instructions which, when executed by at least one processor, causes the processor to perform the method of any one of (1) to (11).

(13) A privacy preserving data storing system, in particular for analyzing a travel behavior of one or more users of mobility-as-a-service (MaaS) transportation services, the system comprising:

a first database for storing at least one user identification, user ID, identifying the one or more users on a trip together with a trip identification, trip ID, identifying the trip in a database entry of the first database;

a separate second database for storing trip information on the trip with the trip ID in a database entry of the second database; and a data processing circuitry for associating the one or more users with the trip based on a combination of the database entries of the first and second databases associated with the same trip ID for an analysis of the travel behavior of the users based on the associated database entries of the first and the second database.

(14) A data processing circuitry for:

receiving at least one user identification, user ID, identifying one or more users on a trip together with a trip identification, trip ID, identifying the trip stored in a database entry of a first database;

receiving trip information on the trip together with the trip ID stored in a database entry of a separate second database; and associating the database entries of the first and second databases associated with the same trip ID for an analysis of the travel behavior of the users based on the associated database entries of the first and the second database.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A privacy preserving data storing method, in particular for analyzing a travel behavior of one or more users of mobility-as-a-service, MaaS, transportation services, the method comprising:
   storing at least one user identification, user ID, identifying the one or more users on a trip together with a trip identification, trip ID, identifying the trip in a database entry of a first database controlled only by a first mobility service provider;
   storing trip information on the trip with the trip ID in a database entry of a separate second database;
   storing the user ID together with the trip ID in a database entry of a third database controlled only by a second mobility service provider, different from the first mobility service provider; and
   associating the database entries of the first, second, and third databases associated with the same trip ID for an analysis of the travel behavior of the users based on the associated database entries of the first, the second, and the third databases.

2. Privacy preserving data storing method of claim 1, wherein the trip information comprises at least one of a start location, a destination, a start time and an end time of the trip.

3. Privacy preserving data storing method of claim 1, wherein the user ID comprises at least one of a name and bank data of at least one of the users.

4. Privacy preserving data storing method of claim 1, wherein the user ID and the trip information are encrypted.

5. Privacy preserving data storing method of claim 1, wherein storing the user ID comprises physically storing a first share of the user ID on a first data storage and physically storing one or more further shares of the user ID on one or more further data storages; and
   wherein the method further comprises recovering the user ID based on the first and the one or more further shares in accordance with Shamir's secret sharing scheme for associating the database entries of the first and second databases associated with the same trip ID.

6. Privacy preserving data storing method of claim 1, further comprising:
   storing at least one first user identification, first user ID, identifying one or more first users on a first trip in a database entry of the first database, the first user ID being associated with a first trip identification, first trip ID, identifying the first trip;
   storing at least one second user identification, second user ID, identifying one or more second users on a second trip in a database entry of the third database, the second user ID being associated with a second trip identification, second trip ID, identifying the second trip;
   storing first trip information on the first trip in a database entry of the second database, the first trip information being associated with the first trip ID;
   storing second trip information on the second trip in a database entry of the second database, the second trip information being associated with the second trip ID; and
   associating the first and the second users with the respective first and second trip based on a comparison of the data base entries of the first, second, and third databases associated with the same trip ID for the analysis of the travel behavior of the users based on the associated database entries of the first, the second and the third database.

7. Privacy preserving data storing method of claim 6, the method comprising executing a secure multi-party computation protocol for the analysis of the travel behavior based on the associated database entries of the first, the second and the third database without exchanging the first and/or the second user ID between any of the databases.

8. Privacy preserving data storing method of claim 6, wherein the analysis of the travel behavior comprises identifying identical users among the first and second users by comparing the first and the second user ID.

9. Privacy preserving data storing method according to claim 7, wherein executing the secure multi-party computation protocol comprises applying private set intersection to the first user ID associated with the first trip information and the second user ID associated with the second trip information for identifying identical users among the first and second users.

10. Privacy preserving data storing method of claim 1, wherein the second database is stored on a blockchain.

11. A computer program comprising instructions which, when executed by at least one processor, causes the processor to perform the method of claim 1.

12. A privacy preserving data storing system, in particular for analyzing a travel behavior of one or more users of mobility-as-a-service (MaaS) transportation services, the system comprising:
   a first database for storing at least one user identification, user ID, identifying the one or more users on a trip together with a trip identification, trip ID, identifying the trip in a database entry of the first database, the first database being controlled only by a first mobility service provider;
   a separate second database for storing trip information on the trip with the trip ID in a database entry of the second database;
   a third database controlled only by a second mobility service provider, different from the first mobility provider, the third database for storing the user ID together with the trip ID; and
   a data processing circuitry for associating the one or more users with the trip based on a combination of the database entries of the first, second, and third databases associated with the same trip ID for an analysis of the travel behavior of the users based on the associated database entries of the first, the second, and the third databases.

13. A data processing circuitry for:
   receiving at least one user identification, user ID, identifying one or more users on a trip together with a trip identification, trip ID, identifying the trip stored in a database entry of a first database controlled only by a first mobility service provider;
   receiving trip information on the trip together with the trip ID stored in a database entry of a separate second database;
   receiving the user ID together with the trip ID stored in a third database controlled only by a second mobility service provider, different from the first mobility provider; and
   associating the database entries of the first, second, and third databases associated with the same trip ID for an analysis of the travel behavior of the users based on the associated database entries of the first, the second, and the third databases.

14. The data processing circuitry of claim 13, for:
   receiving at least one first user identification, first user ID, identifying one or more first users on a first trip in a database entry of the first database, the first user ID being associated with a first trip identification, first trip ID, identifying the first trip;
   receiving at least one second user identification, second user ID, identifying one or more second users on a second trip in a database entry of the third database, the second user ID being associated with a second trip identification, second trip ID, identifying the second trip;
   receiving first trip information on the first trip in a database entry of the second database, the first trip information being associated with the first trip ID;
   receiving second trip information on the second trip in a database entry of the second database, the second trip information being associated with the second trip ID; and
   associating the first and the second users with the respective first and second trip based on a comparison of the data base entries of the first, second, and third databases associated with the same trip ID for the analysis of the travel behavior of the users based on the associated database entries of the first, the second and the third database.

15. The data processing circuitry of claim 14, for:
   executing a secure multi-party computation protocol for the analysis of the travel behavior based on the associated database entries of the first, the second and the third database without exchanging the first and/or the second user ID between any of the databases.

16. The privacy preserving data storing system of claim 12, further comprising:
   the first database further storing at least one first user identification, first user ID, identifying one or more first users on a first trip in a database entry of the first database, the first user ID being associated with a first trip identification, first trip ID, identifying the first trip;

the third database further storing at least one second user identification, second user ID, identifying one or more second users on a second trip in a database entry of the third database, the second user ID being associated with a second trip identification, second trip ID, identifying the second trip;

the second database further storing first trip information on the first trip in a database entry of the second database, the first trip information being associated with the first trip ID, and storing second trip information on the second trip in a database entry of the second database, the second trip information being associated with the second trip ID; and associating the first and the second users with the respective first and second trip based on a comparison of the data base entries of the first, second, and third databases associated with the same trip ID for the analysis of the travel behavior of the users based on the associated database entries of the first, the second and the third database.

17. The privacy preserving data storing system of claim 16, further comprising executing a secure multi-party computation protocol for the analysis of the travel behavior based on the associated database entries of the first, the second and the third database without exchanging the first and/or the second user ID between any of the databases.

18. The privacy preserving data storing system of claim 16, wherein the analysis of the travel behavior comprises identifying identical users among the first and second users by comparing the first and the second user ID.

19. The privacy preserving data storing system of claim 17, wherein executing the secure multi-party computation protocol comprises applying private set intersection to the first user ID associated with the first trip information and the second user ID associated with the second trip information for identifying identical users among the first and second users.

* * * * *